United States Patent
Li

(10) Patent No.: US 8,068,423 B2
(45) Date of Patent: Nov. 29, 2011

(54) PACKET SCHEDULING SYSTEM FOR DIGITAL VIDEO BROADCASTING

(75) Inventor: Xiaoguang Li, Santa Clara, CA (US)

(73) Assignee: Ericsson Television, Inc, Duluth, GA (US)

( * ) Notice: Subject to any disclaimer, the term of this patent is extended or adjusted under 35 U.S.C. 154(b) by 403 days.

(21) Appl. No.: 12/207,052

(22) Filed: Sep. 9, 2008

(65) Prior Publication Data

US 2010/0061399 A1 Mar. 11, 2010

(51) Int. Cl.
*G01R 31/08* (2006.01)
(52) U.S. Cl. .............. 370/235; 370/310; 370/230.1; 370/537; 375/240.01; 725/63
(58) Field of Classification Search .............. 370/235, 370/310, 532–545, 240.23, 315–316; 375/240.01–240.29; 725/63, 67–68, 70–71
See application file for complete search history.

(56) References Cited

U.S. PATENT DOCUMENTS

| 7,418,007 | B1 * | 8/2008 | Liu et al. | 370/468 |
|---|---|---|---|---|
| 7,764,608 | B2 * | 7/2010 | Breynaert et al. | 370/230 |
| 2003/0103525 | A1 * | 6/2003 | Wahl | 370/465 |
| 2004/0073929 | A1 * | 4/2004 | Morello | 725/63 |
| 2007/0096788 | A1 * | 5/2007 | Thesling | 327/284 |
| 2008/0049659 | A1 * | 2/2008 | Ram et al. | 370/316 |
| 2008/0144713 | A1 * | 6/2008 | Kimmich et al. | 375/240.02 |
| 2009/0052323 | A1 * | 2/2009 | Breynaert et al. | 370/235 |

FOREIGN PATENT DOCUMENTS

| EP | 1 408 637 A1 | 4/2004 |
|---|---|---|
| WO | WO 2006/099695 A1 | 9/2006 |
| WO | WO 2007/051079 A2 | 5/2007 |

OTHER PUBLICATIONS

Cantillo et al., A Design Rationale for Providing IP Services Over DVB-S2 Links, Internet-Draft, Dec. 6, 2006, pp. 1-25, No. 4, Internet Engineering Task Force (IETF).
ETSI, Digital Video Broadcasting (DVB) User Guidelines for the Second Generation System for Broadcasting, Interactive Services, News Gathering and Other Broadband Satellite Applications (DVB-S2), Technical Report, Feb. 1, 2005, 104 Pages, vol. 1.1.1, ETSI Standards, Cedex, France.
International Search Report and Written Opinion from International Application No. PCT/US2009/005006 dated Jan. 14, 2010.

* cited by examiner

*Primary Examiner* — Christopher Grey

(57) ABSTRACT

A system and method for processing multiple client flows to a single outbound link is provided. Specifically, a scheduler enforces a maximum symbol rate on the aggregate output flow. Inbound client flows are scheduled for output based upon individual quality of service parameters. For each round of scheduling, packets configured for a first bandwidth range are processed in a first pass and packets configured for a second bandwidth range are processed in a second pass. The packets are placed into frames before transmission. A comparison of the actual symbol usage with the estimated symbol is made and used to determine how to schedule inbound client flows for the second pass of the round.

6 Claims, 4 Drawing Sheets

PACKET SCHEDULING SYSTEM FOR DIGITAL VIDEO BROADCASTING

FIELD OF THE INVENTION

The present invention generally relates to data communications. More particularly, the present invention relates to a system and method for scheduling data to optimize bandwidth and modulation and coding rate usage for digital video broadcasting transmissions.

BACKGROUND OF THE INVENTION

Digital Video Broadcasting-Satellite-Second Generation (DVB-S2) is a standard for satellite broadcasting. In accordance with the DVB-S2 standard, a frame of data packed is known as a baseband frame (BBFRAME). BBFRAMEs can have variable lengths from 3072 to 58192 bits. Further, each frame when transmitted can have different Modulation and Coding rates, or MODCODs. Modulation defines the mapping of bits to symbols and hence defines the number of bits conveyed by a symbol, and coding is used for error correction.

The transmission of transport streams of BBFRAMEs from a transmitter to a receiver may be constant bit rate ("CBR") or variable bit rate ("VBR"). DVB-S2 further supports an adaptive transmission mode: Adaptive Coding and Modulation (ACM). ACM adjusts the carrier's coding and modulation during transmission to optimize quality of service and throughput, adapting to changing link conditions. Thus, based on transmission conditions, a constant symbol rate can convey different bit rates of information.

A network transmitter device may be connected to a single outbound link. If the transmitter device supports multiple inbound client flows, the transmitter device is responsible for arbitrating the sharing of the single outbound link among the multiple inbound client flows.

One prior art arbitration scheme is a first-come-first-serve scheme. In this solution, packets are received by the transmitter device from inbound clients. The packets are transmitted by the transmitter device to the outbound link in the same order in which the packets are received. This scheme does not preclude one client from monopolizing or unfairly consuming the entire outbound link Another prior art arbitration scheme is packet-wise round-robin. In this solution, the transmitter device periodically services each inbound client or incoming queue. The transmitter device sends a packet onto the outbound link each time an inbound client is serviced. This solution prevents a single flow from monopolizing the entire link. However, transmission is not a function of varying incoming packet sizes, and thus fairness among the inbound client streams cannot be guaranteed. Another variation of this scheme is to evaluate each incoming bit from the inbound client. However, while it provides the finest level of granularity, this approach consumes significant resources and is difficult to implement in practice.

None of the prior art methods, however, take into account the flexibility of varying the outbound modulation link encoding when scheduling packets for transmission. Thus, there is a need for systems and methods which take into account the adaptive modulation capability when transmitting frames to more efficiently schedule the multiplexing of input streams.

SUMMARY OF THE INVENTION

In one embodiment of the invention, a device for arbitrating IP communication to an output is provided. The device comprises: (1) a first input buffer to store a first input stream; (2) a second input buffer to store a second input stream; (3) a scheduling multiplexer coupled to the first input buffer and the second input buffer to schedule a plurality of packets for transmission based upon a quota of symbols allocated for consumption as determined by the scheduling multiplexer; (4) an output buffer coupled to the scheduling multiplexer to store packets scheduled for transmission; and (5) a framer coupled to the output buffer to determine an actual symbol consumption and communicate that information to the scheduling multiplexer.

In another embodiment of the invention, a method for arbitrating IP communication to an output is provided. The method comprises receiving a plurality of input flows; identifying a minimum bit rate, a maximum bit rate, and modulation and coding (MODCOD) rates associated with each of the plurality of input flows; dividing packets of the at least two input flows into a first class and a second class; scheduling a round of data transmission comprising a first pass and a second pass, wherein the first pass comprises packets in the first class, wherein the second pass comprises packets in the second class; transmitting packets scheduled to the first pass; and transmitting packets scheduled to the second pass, wherein the transmitted packets are constrained by a present quota of symbols that can be consumed and the quota is determined by an actual symbol consumption communicated to the scheduling multiplexer from a framer transmitting the packets in frames.

The foregoing is a summary of selective embodiments and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 1:
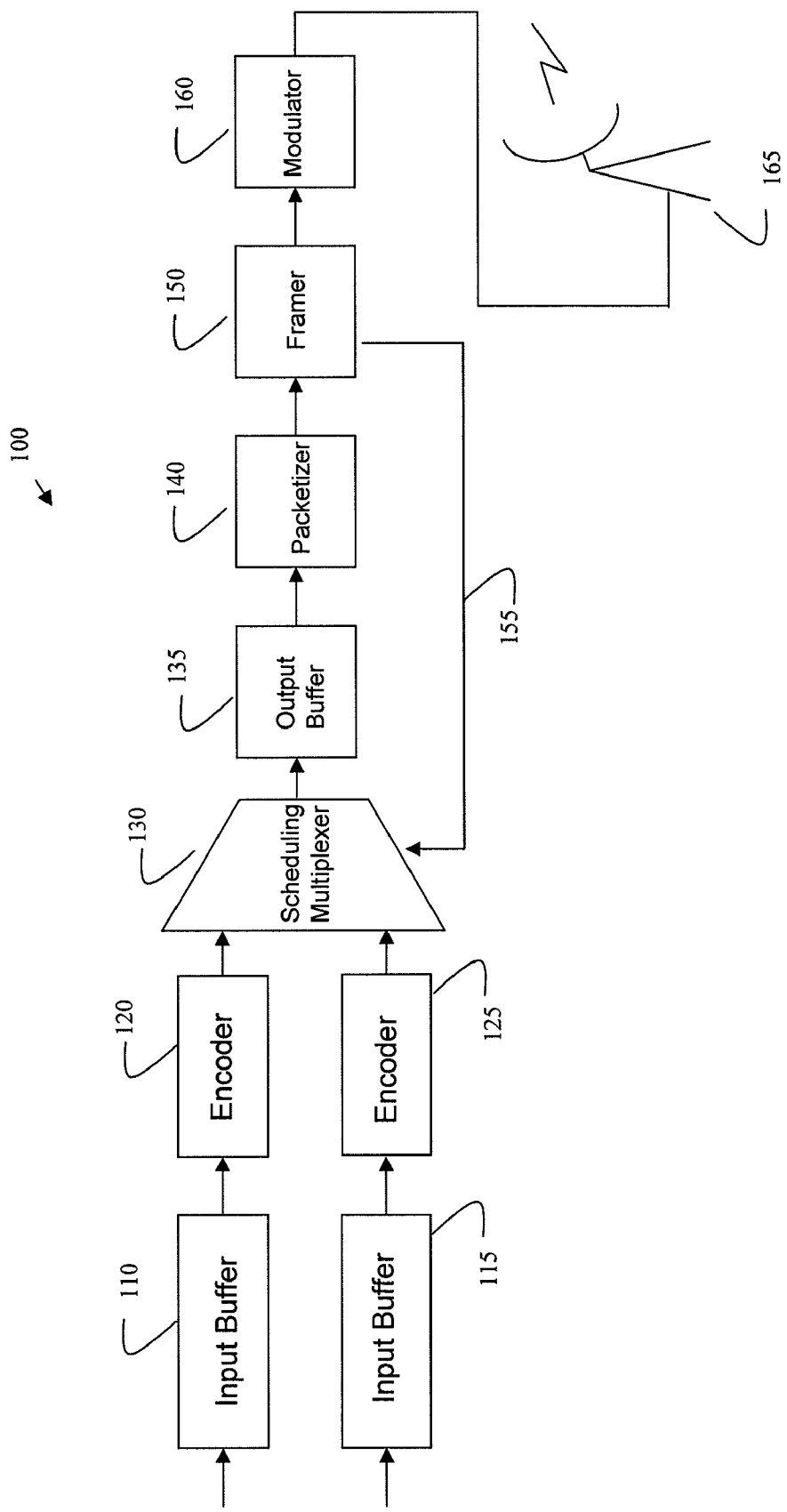
FIG. 1 is a block diagram of an embodiment of a transmitter device for arbitrating IP communication to a network.

The DVB-S2 standard may be used for communicating data via satellite. The data may include Internet Protocol (IP) communications. FIG. 1 depicts a block diagram of an embodiment of a transmitter device for arbitrating IP communication to a network or output communication link. The IP communication over satellite may be voice, Transmission Control Protocol (TCP), or User Datagram Protocol (UDP). Other forms of data can be used according to the principles of the present invention.

The transmitter device 100 may comprise input buffers 110, 115, encoders 120, 125, scheduling multiplexer 130, output buffer 135, packetizer 140, framer 150, and modulator 160. Input buffer 110 may be coupled to encoder 120, and input buffer 115 may be coupled to encoder 125. Encoders 120, 125 may be coupled to scheduling multiplexer 130. Scheduling multiplexer 130 may be coupled to output buffer 135. Output buffer 135 may be coupled to packetizer 140. Packetizer 140 may be coupled to framer 150. Framer 150 may be coupled to modulator 160. The framer receives the packets and forms the frames. The framer also computes the actual number of symbols required for transmitting the packets. Because the framer may put a frame into one of several MODCOD codings, the number of symbols required to transmit a packet or set of packets in a frame is not known until the framer completes its processing.

The transmitter device 100 may receive a plurality of input streams. Although FIG. 1 depicts a multiplexer with two inputs and the discussion is presented in the context of a multiplexer with two inputs, the principles of the invention can apply to other embodiments, including a device with N inputs. Thus, although not depicted in FIG. 1, the transmitter device 100 may have N input buffers, where N is an integer representing the number of input streams. Each input stream is stored to a data buffer or queue. For example, the first input stream may be stored to input buffer 110, which could be a first-in-first out queue, and the second input stream may be stored to input buffer 115. For this embodiment of the invention, the plurality of inbound client flows share a single outbound link.

The input streams may be of varying types, as are the lengths, and modulation and coding methods (MODCODs). Each input stream may comprise, or can be associated in some way with characteristics associated with the outbound transport stream, namely: quality of service parameters such as minimum bit rate, maximum bit rate, and MODCODs. The bit rates or other quality of service parameters of an input stream may be used to reserve bandwidth for an outbound transport stream. The network may have a finite outbound bandwidth for transferring data. A minimum bit rate and a maximum bit rate, which define data transmission requirements that may be configured by a user or other system components. The minimum bit rate of an input stream may be the required guaranteed bandwidth provided by the scheduler (multiplexer) to transfer the transport stream, whereas the maximum bit rate may define a "best effort" bandwidth to maximize data transfer.

An input stream of IP packets may undergo encoding after being received by an input buffer. The encoder 120 may compress and convert input packets from input buffer 110 into another digital format. The encoder 125 may compress and convert input packets from input buffer 115 to another digital format as well. The first encoder 120 generates a first elementary stream and the second encoder 125 generates a second elementary stream. The first and second processes are not required to have the same characteristics and processing.

The elementary streams are input to scheduling multiplexer 130 for scheduling transmission to the network. The output transmission should transmit the transport streams without exceeding the outbound link bandwidth and which cannot exceed the maximum symbol rate, and which is typically constant. The scheduling multiplexer 130 may divide the input flows into classes based on priority. For example, priority may be defined by minimum and maximum bit rates. The scheduling multiplexer 130 estimates a number of packets or symbols to transmit without violating the aggregate symbol rate constraint of the outbound link. This estimate may be performed by comparing an input flow's bit rates against the aggregate symbol rate constraint of the outbound link. The scheduling multiplexer 130 may schedule a number of packets for transmission which does not exceed the estimated number of packets or symbols to transmit. Scheduling is typically performed periodically, or in scheduling rounds. While both the inbound client flows and the outbound link may be variable in terms of bit rate, the outbound link typically is constant in terms of symbol rate. Scheduling algorithms are described in further detail below in FIGS. 2 and 3.

Packets that are scheduled for transmission are sent to output buffer 135. Packets may be collected in output buffer 135 to improve subsequent transport stream packing efficiency. The storage capacity of the output buffer 135 may be approximately equal to the network bandwidth based on the duration of the scheduling round. The output buffer 135 may accumulate a number of packets that approximately equals the estimated number of symbols to be transmitted for the scheduling round.

The IP packets scheduled for transmission may be packetized into MPEG-2 transport stream packets in packetizer 140. One skilled in the art will recognize that other transport protocol schemes could be used. Each packetized elementary stream (PES) typically comprises a header and a payload. The header may contain information necessary to decode the payload bits and the payload may comprise IP data.

The packetized elementary streams are framed in framer 150. At this point, in the present embodiment, each packetized elementary stream is placed into BBFRAMEs. To make use of available bandwidth efficiently, the framer 150 may transmit data in a packet scheduled for a more efficient MODCOD using instead frame having a less efficient MODCOD. The number of symbols used to transmit the BBFRAMEs is determined by the framer 150, which communicates that information to the scheduling multiplexer 130 via feedback path 155. A framing algorithm is described in greater detail in FIG. 4 below. The scheduling multiplexer 130 may adjust the allocated quota of symbols that can be consumed, for the next round of scheduling based on the actual symbol consumption of the prior round in order to maintain a constant symbol rate.

The modulator 160 converts a framed transport stream into a stream of radio frequency (RF) symbols which are transmitted by an antenna 165. The stream of RF symbols are transmitted to the network (or to a destination that is not a network) on a single outbound link. Although this embodiment is illustrated using a satellite transmission link, other technologies can be used.

Figure 2:
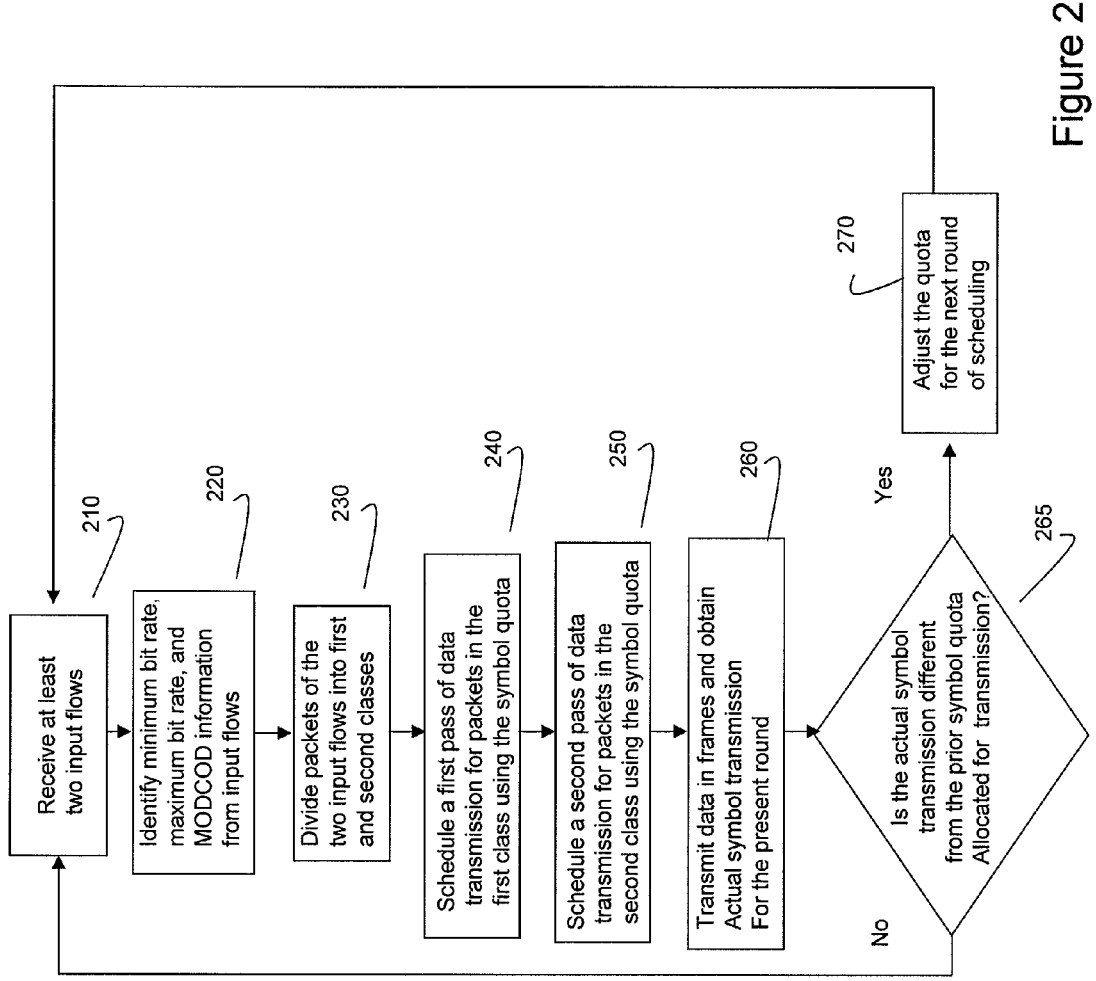
FIG. 2 is a flowchart of an embodiment of a weighted fair queuing scheduling algorithm.

FIG. 2 depicts a flowchart of an embodiment of a weighted fair queuing scheduling algorithm, which is one embodiment of an input queuing scheduling algorithm. In operation 210, at least two input flows are received. The input flows may comprise IP data. In operation 220, minimum bit rate, maximum bit rate, and MODCODs information may be extracted or otherwise obtained and associated with each input flow.

In operation 230, the at least two encoded input flows may be divided into classes. For example, packets having a bit rate less than the minimum bit rate may be grouped into a first class and the remaining packets having from a minimum bit rate to a maximum bit rate are grouped into a second class. Packets of the second class may be further divided or prioritized based upon their size and MODCOD. Other schemes for grouping packets into classes are possible.

In operation 240, a first pass of data transmission is scheduled. This first pass may include all packets in the first class. The bandwidth for these packets is guaranteed.

In operation 250, a second pass of data transmission is scheduled for packets in the second class. Data transfer may be scheduled in descending stages by a weighted fair queuing scheme in which each input buffer is weighted by the number of remaining bits eligible for transmission in the current pass. The number of bits or packets scheduled for transmission in a given round may depend upon the allocated quota of symbols that are estimated for consumption and the bandwidth of the outbound link.

In operation 260, the packets marked for transmission are encapsulated into MPEG-2 transport stream packets, placed into baseband frames, and transmitted. The actual symbol consumption for the round is obtained. Either all eligible packets were transmitted or if not, some of the eligible packets must wait for the next round.

The actual symbol consumption for the round is determined by the framer, and it communicates this information back to the scheduling multiplexer in real time. In operation 265, the scheduling multiplexer determines whether the actual symbol consumption in operation 260 is different from the previously estimated (allocated quota) symbol consumption in operation 250. In other embodiments, the framer or another entity (not shown) determines the quota of allowable symbol use for the next transmission round and communicates the quota to the multiplexer. In either case, the information is determined in real time so that the multiplexer can use the information to impact the next round of transmission. If all eligible packets were transmitted, the difference between the estimated and actual symbol consumption transmitted are filled with stuffing BBFRAMEs at the lowest MODCOD. Any eligible packets that were not transmitted are carried over to the next round of scheduling.

In operation 265, if the actual symbol consumption is the same or approximately equal to the estimated symbol consumption, the algorithm may return to operation 210 to begin the process for the next round of scheduling. Approximately equal to can be defined by not exceeding a threshold difference. Each scheduling round may comprise a first pass and a second pass. Scheduling may occur periodically. For example, a scheduling round may occur according to a clock cycle, which may typically be approximately 20 milliseconds.

On the other hand, if the actual symbol consumption is different from the estimated symbol consumption, the quota of symbols that can be used for transmission for the next round may be appropriately adjusted. For example, if more symbols were used than the current quota, then the multiplexer will decrease the allocated symbols for the next round (i.e., less data should be transmitted). In this manner, the multiplexer scheduler attempts to maintain a constant symbol rate. High symbol consumption relative to the quota means that more symbols than expected were transmitted in the current round and therefore the quota for the next round must be decreased to compensate. Similarly, if less symbols were used relative to the current quota, then the quota should be increased for the next round (i.e., more data can be transmitted.). Again, this allows the scheduler to maintain a constant symbol rate. The modification of the estimated quota for the next round can be in proportion to the difference. Because of this symbol compensation between rounds, a steady overall symbol rate is maintained. The algorithm may return to operation 210 following operation 270 to begin the process for the next round of scheduling.

Figure 3:
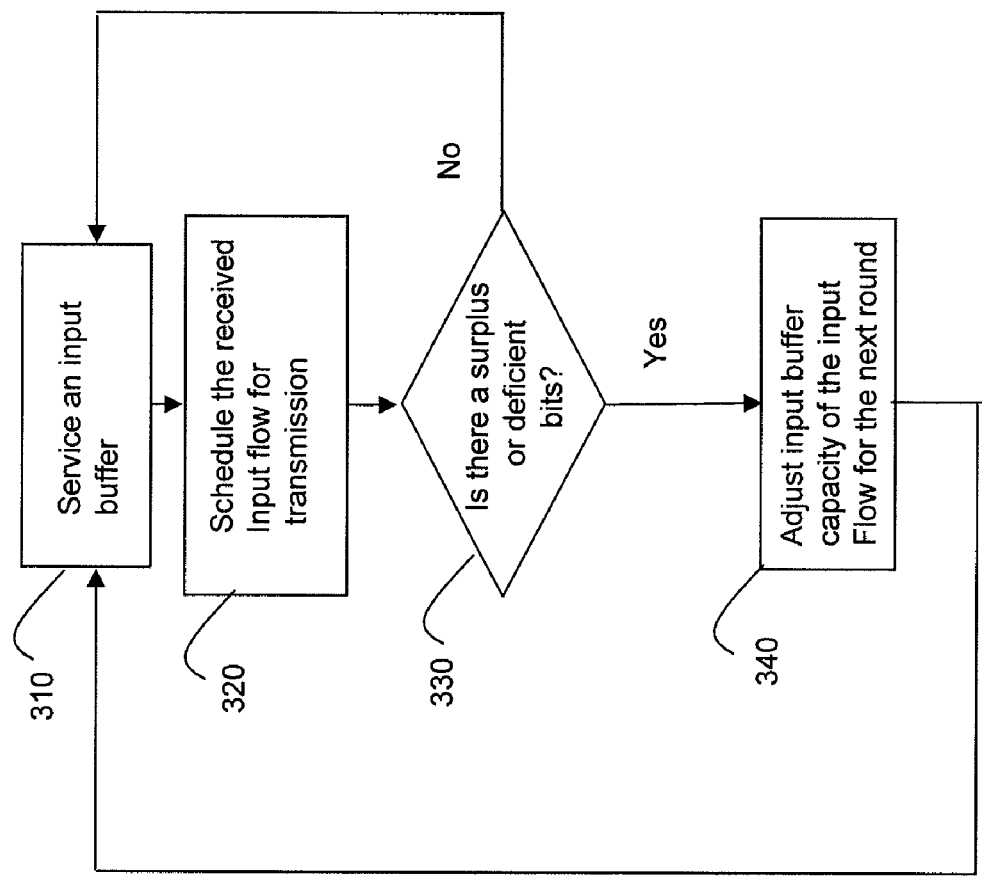
FIG. 3 is a flowchart of an embodiment of a round robin scheduling algorithm.

FIG. 3 depicts a flowchart of an embodiment of a round robin scheduling algorithm. In operation 310, an input buffer is serviced. The input buffer contains an input flow from a client. The input buffer may have a predefined capacity. Packets may be read from the input buffer.

In operation 320, the packets received by the input buffer are scheduled for transmission. For this embodiment of the invention, each client is periodically serviced. An input flow is scheduled for transmission as it is read from an input buffer. Each client has its own input buffer. If an input flow has more bits than the input buffer can store, additional information needs to be sent. Otherwise, if an input flow has fewer bits than the capacity of the input buffer, less information needs to be sent.

In operation 330, if there is no surplus or deficit of information to be sent, the algorithm returns to operation 310 to service the next input buffer. On the other hand, if there is a deficit or surplus of unsent bits, in operation 340, the input buffer capacity of the client is adjusted appropriately (e.g., by the deficit or surplus amount) for the next round. This is accomplished by increasing or decreasing the allocated symbol consumption quota for the next round as described above. Client flows may be allocated unequal shares of the outbound link by assigning them unequal input buffer capacities. The algorithm returns to operation 310 following operation 340.

Although two scheduling algorithms are disclosed, the principles of the present invention may be used with, and are not dependent on, a variety of scheduling algorithms.

Figure 4:
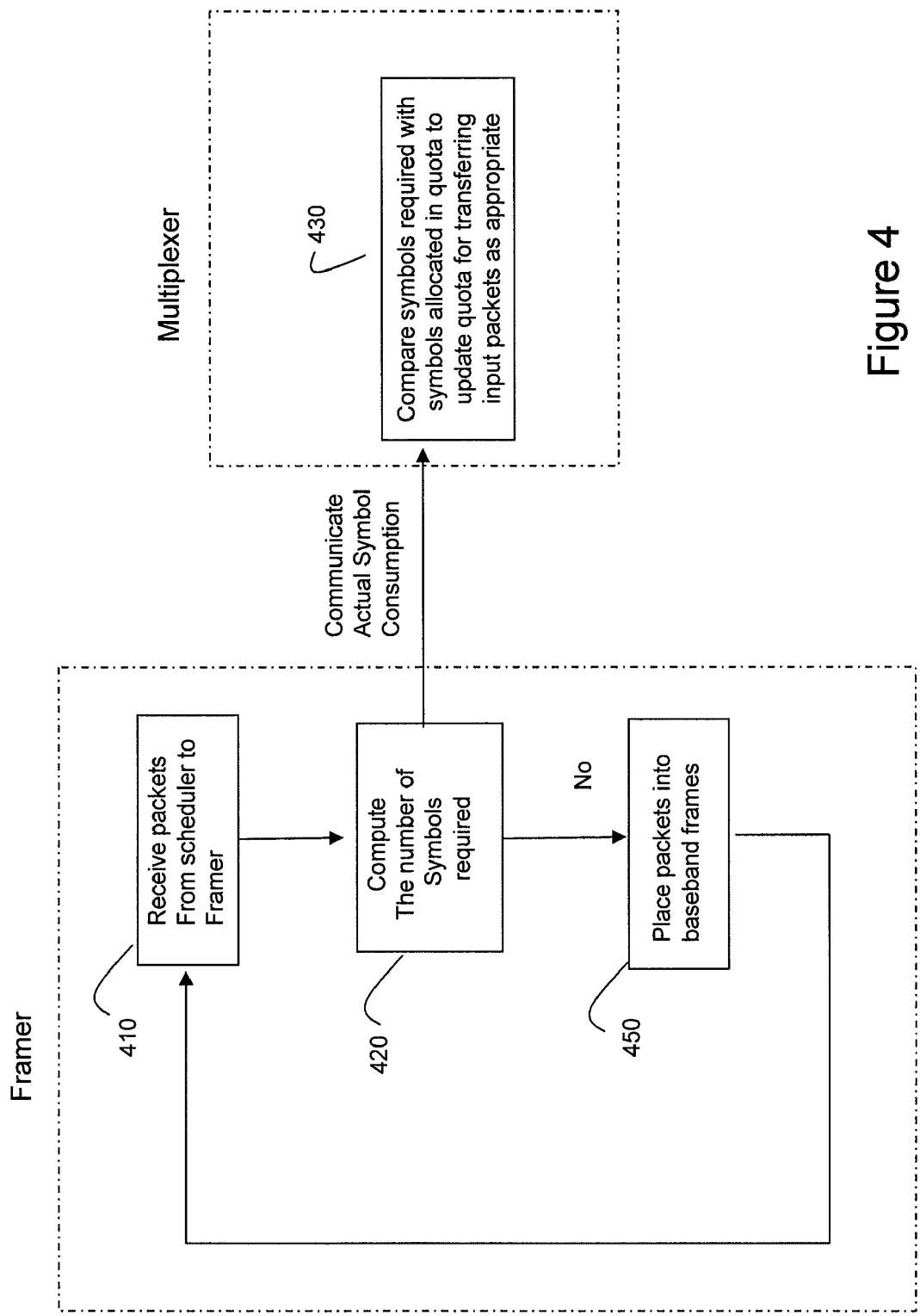
FIG. 4 is a flowchart of an embodiment of a framing algorithm.

FIG. 4 depicts a flowchart of an embodiment of a framing algorithm and its relation to the multiplexer. In operation 410, packets are received from a scheduler for the current round of transmission. In operation 420, the number of symbols used to transmit these packets is determined for this round. At this time, the information is communicated to the multiplexer 430. The multiplexer 430 uses this information to determine whether the allocated symbol count or quota should be adjusted (increased or decreased) for the next round. The multiplexer then uses the available quota of symbols, which indicate a capacity for transmitting information, to determine the appropriate number of bits from the input streams to schedule for transmission.

Changing the MODCOD from the next round to the current round, or vise versa, may be required based on link conditions or other link requirements. The framer may use a less efficient (e.g., lower) MODCOD if doing so would result in consumption of fewer symbols. For example, the framer may do so to avoid sending the frame with unused capacity.

The scheduler may use the information to compensate appropriately in scheduling the estimated symbol consumption for the next round during 430. As previously noted, if additional symbols are used for the current transmission round relative to the quota, then the estimated symbol consumption for the next round will be proportionally decreased (e.g., fewer data should be transmitted). If fewer symbols are used for the current transmission round, then the estimated symbol consumption for the next round will be proportionally increased (e.g., more data should transmitted).

If there are no symbol adjustments to be made in operation 430, the actual packets to be transmitted are placed into BBFRAMEs in operation 450. If there are symbol adjustments to be made in operation 430, the multiplexer adjusts the amount of data to be transmitted based on the allocated symbol quota.

In the forgoing specification, the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method for scheduling input flows in a scheduling multiplexer, comprising the steps of:
   - receiving a plurality of input flows at a first input buffer and a second input buffer associated with the scheduling multiplexer;
   - receiving an actual symbol consumption value from a framer transmitting a first plurality of packets previously multiplexed by the scheduling multiplexer and provided to a packetizer which in turn provides the first plurality of packets to the framer;
   - determining a present estimated symbol quota value in the scheduling multiplexer based on comparing the actual symbol consumption value with a previous estimated symbol quota,
   - wherein said present estimated symbol quota value is reduced relative to the previous estimated symbol quota if the actual symbol consumption value was greater than the previous estimated symbol quota, and
   - wherein said present estimated symbol quota value is increased relative to the previous estimated symbol quota if the actual symbol consumption was less than then previous estimated symbol quota; and
   - multiplexing a first number of bits from the first input buffer with a second number of bits from the second input buffer based on the present estimated symbol quota value.

2. The method of claim 1 wherein the framer transmits the packets at an indicated modulation and coding (MODCOD) and determines the actual symbol consumption value based on the MODCOD used to transmit the first plurality of packets.

3. The method of claim 2 wherein the framer transmits the actual symbol consumption value to the scheduling multiplexer.

4. The method of claim 1 wherein said present estimated symbol quota value is maintained if the actual symbol consumption is the same as the previous estimated symbol quota.

5. The method of claim 1 where the first plurality of packets comprise MPEG-2 packets.

6. The method of claim 1 wherein each input flow is associated with a respective scheduled modulation and coding (MODCOD) and the framer transmits at least one input flow in a baseband frame using a MODCOD lower than the respective scheduled MODCOD.

\* \* \* \* \*